US012457912B2

(12) United States Patent
Latham

(10) Patent No.: US 12,457,912 B2
(45) Date of Patent: Nov. 4, 2025

(54) MECHANICAL SOIL CONDITIONER SYSTEM

(71) Applicant: Nicholas Arthur Latham, Lebanon, IN (US)

(72) Inventor: Nicholas Arthur Latham, Lebanon, IN (US)

( * ) Notice: Subject to any disclaimer, the term of this patent is extended or adjusted under 35 U.S.C. 154(b) by 406 days.

(21) Appl. No.: 18/064,639

(22) Filed: Dec. 12, 2022

(65) Prior Publication Data

US 2024/0188470 A1 Jun. 13, 2024

(51) Int. Cl.
*A01B 29/04* (2006.01)

(52) U.S. Cl.
CPC .................................. *A01B 29/045* (2013.01)

(58) Field of Classification Search
CPC ............................ A01B 29/041; A01B 29/045
USPC ......................................................... 172/554
See application file for complete search history.

(56) References Cited

U.S. PATENT DOCUMENTS 999,014 A 7/1911 Laney
1,032,636 A 7/1912 Watkins
1,348,279 A 8/1920 Heywood
1,681,675 A 8/1928 Miller
1,951,101 A 3/1934 Miller
2,257,169 A 9/1941 Hopps
2,306,798 A 12/1942 Benninghoff
2,547,789 A 4/1951 Skeel
2,628,821 A * 2/1953 Alexander et al. ..... E21B 10/58 175/420.1
2,689,108 A 9/1954 Haglund
2,751,006 A 6/1956 Lane
3,442,342 A * 5/1969 McElya et al. ......... E21B 10/52 175/426
3,574,251 A 4/1971 Corti
4,009,742 A 3/1977 Ziegelmeyer
4,305,440 A 12/1981 Lacasse
4,326,592 A 4/1982 Stephenson
4,480,873 A 11/1984 Latham
(Continued)

FOREIGN PATENT DOCUMENTS

GB 2 454 918 A 5/2009

OTHER PUBLICATIONS

Dynatech Pavement Marking, dated Jan. 14, 2016, pp. 1-31, Dynatech, Elyria, Ohio.

(Continued)

*Primary Examiner* — Tara Mayo
(74) *Attorney, Agent, or Firm* — Crowell & Moring LLP

(57) ABSTRACT

A soil conditioner system includes a bit body. A first buffer bit and a second buffer bit may be mounted in a back-to-back configuration on the bit body. The first buffer bit and the second buffer bit may be mounted in respective recesses formed in the bit body on opposite sides of the bit body. The bit body includes a mounting surface at a second end of the bit body that is used to rigidly couple the bit body with a horizontally rotatable member such that the bit body extends transversely away from an outer surface of the horizontally rotatable member. The bit body includes a first side and a second side disposed on opposing sides of the bit body to face opposite directions of horizontal rotation of the horizontally rotatable member. The first and second sides are positioned between the mounting surface and the first buffer bit and the second buffer bit, respectively.

20 Claims, 11 Drawing Sheets

(56) References Cited

U.S. PATENT DOCUMENTS

| | | | | | |
|---|---|---|---|---|---|
| 4,716,977 | A * | 1/1988 | Huffstutler | E21B 10/16 | 175/426 |
| 4,819,748 | A * | 4/1989 | Truscott | E21B 10/58 | 175/420.1 |
| 4,880,278 | A | 11/1989 | Tomlinson | | |
| 5,052,757 | A | 10/1991 | Latham | | |
| 5,066,180 | A | 11/1991 | Lang et al. | | |
| 5,201,376 | A * | 4/1993 | Williams | E21B 10/52 | 175/426 |
| 5,240,192 | A | 8/1993 | Tilby et al. | | |
| 5,429,199 | A | 7/1995 | Sheirer et al. | | |
| 5,529,249 | A | 6/1996 | Braun et al. | | |
| 5,647,419 | A | 7/1997 | Stewart | | |
| 5,687,799 | A * | 11/1997 | Greenfield et al. | E02D 3/026 | 172/554 |
| 5,857,506 | A | 1/1999 | Paolone | | |
| 5,884,979 | A | 3/1999 | Latham | | |
| 5,904,408 | A | 5/1999 | Olson et al. | | |
| 6,364,227 | B1 | 4/2002 | Dorscht | | |
| 6,427,791 | B1 | 8/2002 | Glowka et al. | | |
| 6,520,440 | B2 | 2/2003 | Ragnarsson | | |
| 7,069,969 | B2 | 7/2006 | Knappett et al. | | |
| 7,086,812 | B2 | 8/2006 | Gamble et al. | | |
| 7,108,212 | B2 | 9/2006 | Latham | | |
| 7,290,726 | B2 | 11/2007 | Latham | | |
| 7,300,115 | B2 | 11/2007 | Holl et al. | | |
| 7,338,134 | B2 | 3/2008 | Latham | | |
| 7,637,574 | B2 | 12/2009 | Hall et al. | | |
| 7,686,106 | B2 * | 3/2010 | Baker et al. | E21B 10/50 | 175/430 |
| 7,959,099 | B1 | 6/2011 | Cox et al. | | |
| 8,066,213 | B2 | 11/2011 | Marquardsen | | |
| 8,079,431 | B1 | 12/2011 | Cooley et al. | | |
| 8,501,144 | B1 | 8/2013 | Bertagnolli | | |
| 9,631,490 | B2 | 4/2017 | Latham | | |
| 10,876,401 | B1 * | 12/2020 | Taitt et al. | E21C 35/197 | |
| 11,408,135 | B2 | 8/2022 | Latham | | |
| 2001/0045478 | A1 | 11/2001 | Recker et al. | | |
| 2003/0010403 | A1 | 1/2003 | Smith | | |
| 2005/0098015 | A1 | 5/2005 | Latham | | |
| 2008/0164069 | A1 * | 7/2008 | McDonough et al. | E21B 10/16 | 175/374 |
| 2008/0175686 | A1 | 7/2008 | Wallek | | |
| 2013/0334866 | A1 | 12/2013 | Pederson et al. | | |
| 2014/0327294 | A1 | 11/2014 | Johnson et al. | | |
| 2014/0339879 | A1 | 11/2014 | Burton et al. | | |

OTHER PUBLICATIONS

Diamond Edged Cutter Blades for Asphalt, dated at least as early as 2012, pp. 1-8, available at URL: http://wel-co.com/wel-co_products/pavement-marking/diamond-edged-cutter-blades.html Wel-Co Diamond Tool Corp., 2012, Oldsmar, Florida.

* cited by examiner

MECHANICAL SOIL CONDITIONER SYSTEM

TECHNICAL FIELD

The present disclosure relates to soil conditioner and more particularly to a mechanical soil conditioner system for conditioning soil or other worked material.

BACKGROUND

Soil conditioning is the process of changing the composition or behavior characteristics of soil. Such soil conditioning may be desired during farming, construction or other uses of the soil. Conditioning soil may occur using soil amendments in the form of additives, such as fertilizer, to change or improve characteristics of the soil. Alternatively or in addition, conditioning soil may involve, for example, mechanically disturbing the soil in order to break up/loosen the soil, promote growth, and/or improve aeration.

DETAILED DESCRIPTION

The disclosure generally relates to a soil conditioner system that includes a bit body having a first side and a second side that are positioned on opposing sides of the bit body. The bit body also includes, at a first end of the bit body, a first recess on the first side and a second recess on the second side, such that the first recess and the second recess are on the opposing sides of the bit body. The bit body also includes, at a second end of the bit body, a mounting surface. The mounting surface may be coupled with a rotatable member, which is bi-directionally rotatable about a horizontal central axis along which the rotatable member longitudinally extends.

The soil conditioner system also includes a first buffer bit and a second buffer bit. The first buffer bit is mounted in the first recess. The first buffer bit includes a planar cutting surface positioned at a first rake angle. The second buffer bit is mounted in the second recess. The second buffer bit includes a planar cutting surface positioned at a second rake angle such that the first buffer bit and the second buffer bit are on opposite sides of the bit body with respective planar cutting surfaces lying in intersecting planes.

An interesting feature of the soil conditioner system is that the rake angle of the first buffer bit and the rake angle of the second buffer bit are substantially equal.

Another interesting feature of the soil conditioner system is that

These and other features and their corresponding advantages of the disclosed combination will become readily apparent to those skilled in the art from the following detailed description of a preferred embodiment when considered in the light of the accompanying drawings.

DESCRIPTION OF PREFERRED EMBODIMENTS

Figure 1:
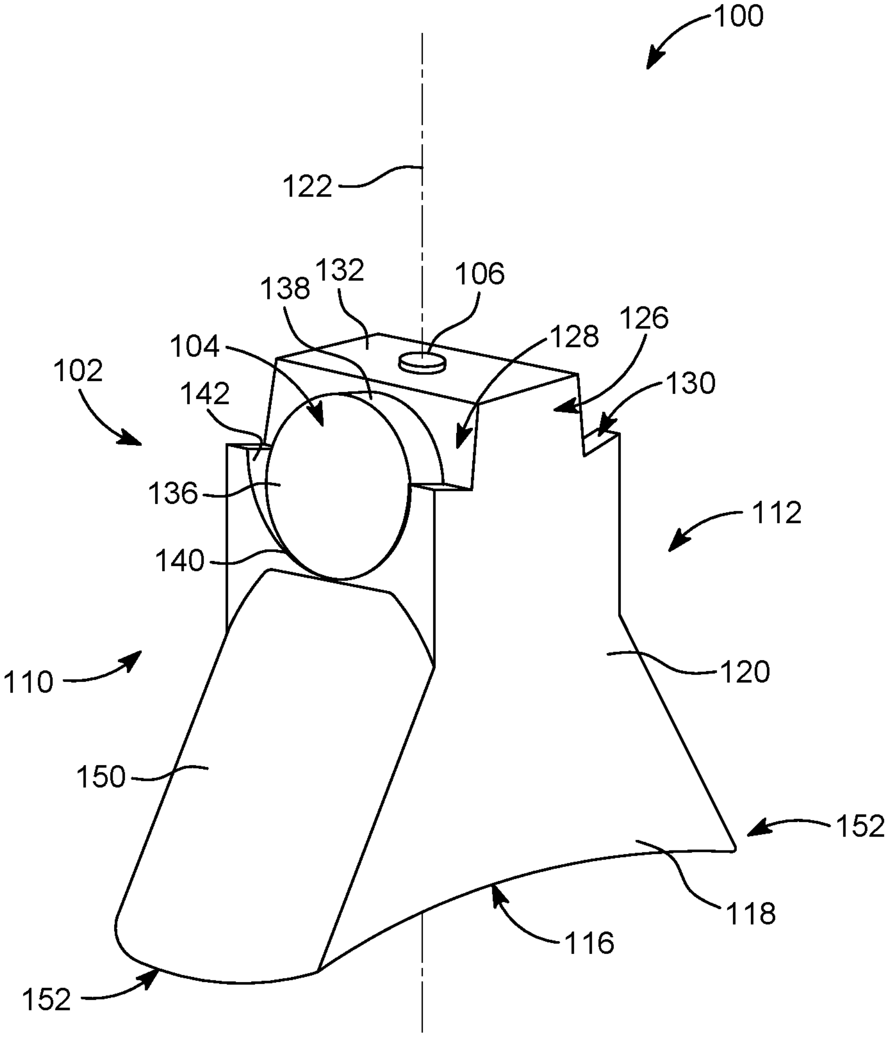
FIG. 1 is a perspective view of an example soil conditioner in a soil conditioner system.

With reference to all the drawings, the same reference numerals are generally used to identify like components. FIG. 1 is a perspective view of an example soil conditioner 100 in a soil conditioner system. The soil conditioner 100 may be radially mounted on a cylindrical outer surface of a horizontally rotatable member, such as a shaft or drum.

Figure 2:
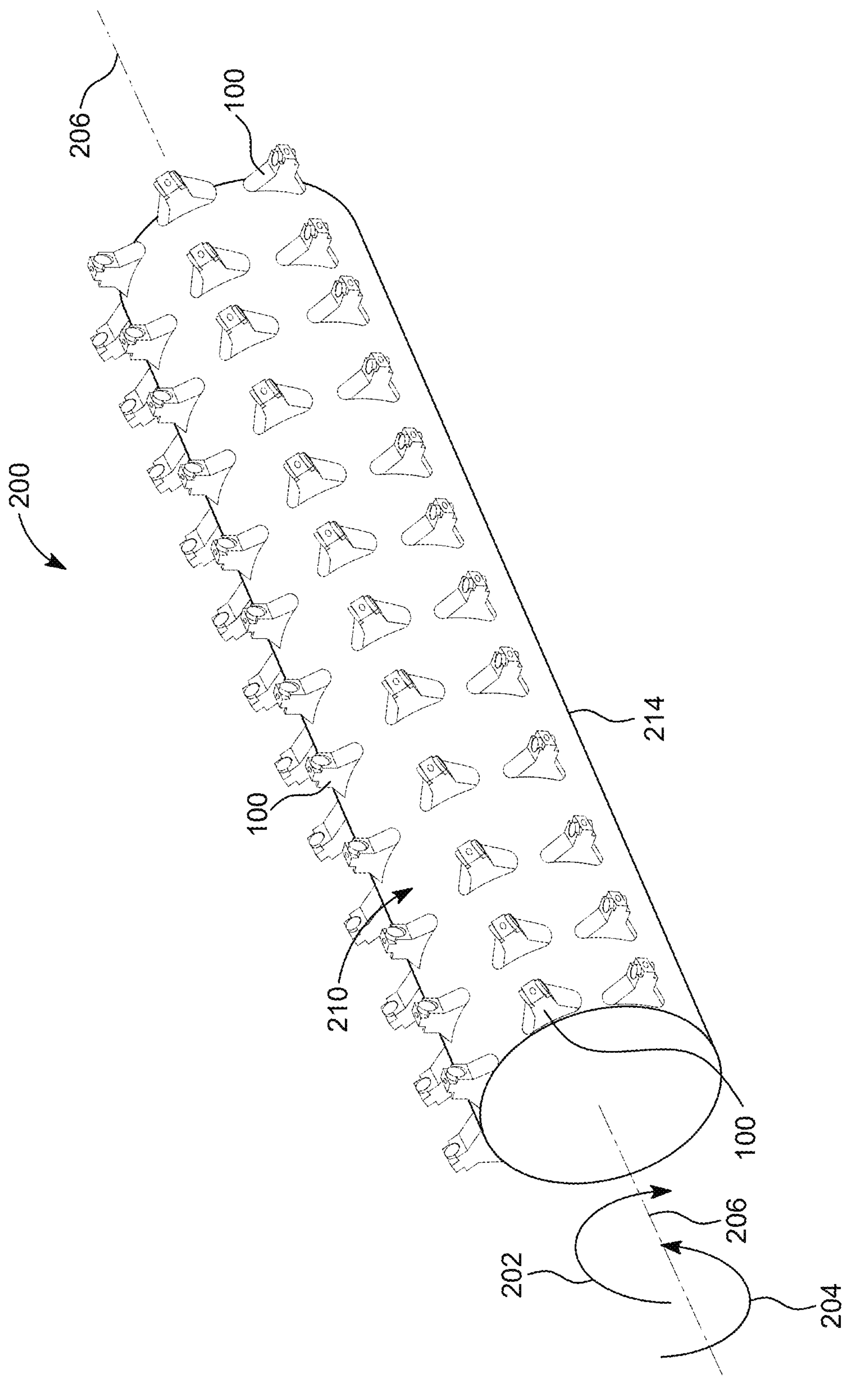
FIG. 2 is a perspective view of a horizontal rotatable member having soil conditioners mounted thereon.

FIG. 2 is a perspective view of a horizontal rotatable member 200 having soil conditioners 100 mounted thereon. The rotatable member 200 may be a drum, a pole, a shaft or some other structure made of rigid material, such as metal, plastic, carbon fiber, and the like that longitudinally extends in a horizontal direction. The rotatable member 200 may horizontally rotate in a first direction 202 or in a second direction 204 around a horizontal central axis 206 of the rotatable member 200. The first and second directions 202 and 204 may be opposite directions, such as clockwise rotation and counterclockwise rotation. The soil conditioners 100 may be mounted on an outer surface 210 of the rotatable member 200 to extend transversely away from the outer surface 210. In examples, soil conditioners 100 may extend perpendicularly or orthogonally away from the longitudinally extending outer surface 210 of the rotatable member 200.

The outer surface 210 of the rotatable member 200 may be cylindrical and have a predetermined radius of curvature (r) with respect to the horizontal central axis 206. Accordingly, the soil conditioners 100 mounted on the outer surface 210 of the rotatable member 200 may uniformly engage with, and proceed through a worked material, such as soil as the rotatable member 200 rotates. In examples, the outer surface 210 may be other than cylindrical and the position of the soil conditioners 100 may be other than uniformly mounted. Although the term "soil" is used herein, to describe the worked material, it should be recognized that the system may also be used on other types of worked material, such as materials capable of being aerated, separated and/or density adjusted by the contacting rotation of the soil conditioners 100.

In the example of FIG. 2, the soil conditioners 100 are direct mounted on the outer surface 210 by a coupling material, such as brazing or welding. In other examples, the soil conditioners 100 may be mechanically fastened to the rotatable member 200 by fasteners, such as threaded fasteners, a chuck, a wedge lock, or some other form of coupling system. In examples, mechanical fastening of the soil conditioners 100 to the rotatable member 200 may be accomplished with a base receiver that is mechanically coupled with the rotatable member 200 and receives and fixedly holds a respective soil conditioner 100, and/or threaded apertures in the rotatable member 200 that engage threads on respective soil conditioners 100.

The soil conditioners 100 may be mounted on the outer surface 210 in a predetermined arrangement or pattern. For example, the soil conditioners 100 may be mounted to create a lacing pattern, or some other pattern. In an example, the soil conditioners 100 may be positioned on the surface 210 such that the worked material that the soil conditioners 100 proceed through as the rotatable member 200 rotates is re-arranged, displaced, aerated, density adjusted and/or disturbed by the soil conditioners 100 in a predetermined consistent way, such as by being uniformly/evenly distributed. For example, the soil conditioners 100 may be positioned on the outer surface 210 such that the worked material includes gaps, furrows, pockets and/or raised areas after the soil conditioners 100 rotatably advance through the worked material. The predetermined arrangement or pattern of the soil conditioner bits may also sift the working material to separate other material or different sized material, such as sticks, roots, material clumps and/or rocks. The distance between the central axis 206 and a contact surface 214 of a worked material may be adjusted to be greater or less to adjust a penetration depth of the soil conditioners 100 into the worked material, such as by raising and lowering the rotatable member 200.

Referring to FIGS. 1 and 2, the soil conditioner 100 includes a bit body 102, buffer bits 104, and a wear insert 106. The bit body 102 may be metal, such as steel, or some other rigid abrasion resistant material. The bit body 102 includes a first side 110 facing the first direction of rotation 202, and a second side 112 facing a second direction of rotation 204 of the rotatable member 200. The first and second sides 110 and 112 are opposing sides of the bit body 102 as illustrated in FIG. 1. The bit body 102 also includes a mounting surface 116 with suitable geometry for coupling or mating with the outer surface 210 of the rotatable member 200 either via direct contiguous coupling, or via a base receiver (not shown) mounted on the rotatable member 200. In the example of FIG. 1, the mounting surface 116 is a curved surface having a radius of curvature of the rotatable member 200. The mounting surface 116 may include a perimeter edge 118 adapted for welded attachment to the rotatable member 200, and/or mechanically coupling with a base receiver, and/or engagement with an aperture in the outer surface 210, and/or engagement with the outer surface 210.

The bit body 102 may also include opposing sidewalls 120. The opposing sidewalls 120 may be generally flat planar surfaces disposed in respective planes that are parallel with a central axis 122 of the bit body 102, and intersecting planes in which the first side 110 and the second side 112 are disposed. The central axis 122 may be orthogonal with respect to the outer surface 210 of the rotating member 200.

The bit body 102 may including, at a first end 126 of the bit body 102, a first recess 128 on the first side 110, a second recess 130 on the second side 112, and a top surface 132. Positioned in each of the first recess 128 and the second recess 130 are respective buffer bits 104. The wear tip 106 may be mounted in the top surface 132 to coincide with the apex of the first end 126 of the bit body 102. The wear tip 106 may be a durable material, such as carbide steel or poly crystalline diamond (PCD) that is more wear resistant than the bit body 102 to minimize deterioration due to abrasion by the worked material. In other examples, the wear tip 106 may be mounted on the top surface 132, or omitted. The opposing sides 120 extend from the lower surface 116 to the top surface 132 and also define peripheral edges of the top surface 132. The opposing side walls 120 may lie in planes that are generally perpendicular to the top surface 132.

The buffer bits 104 may be dimensioned to be removably mounted within the respective first and second recesses 128 and 130. The buffer bits 104 may have a contact surface 136 for contacting the worked material. The buffer bits 104 may be formed of hardened metal, such as carbide steel. In examples, the buffer bits may include a diamond composition. The diamond composition may be diamond, polycrystalline diamond, natural diamond, synthetic diamond, vapor deposited diamond, silicon bonded diamond, cobalt bonded diamond, thermally stable diamond, infiltrated diamond, layered diamond, cubic boron nitride, diamond impregnated matrix, diamond impregnated carbide, metal catalyzed diamond, or combinations thereof. The buffer bits 104 are illustrated as having a cylindrical shape of a predetermined thickness, however, in other examples, any of a variety of shapes and/or thicknesses may be mounted within correspondingly shaped recesses 128 and 130.

The buffer bits 104 may be a radial cutter bit with opposing flat surfaces and a surrounding radial edge as illustrated. An upper end 138 of the surround radial edge of the buffer bits 104 may be aligned on the bit body 102 to provide first contact with the worked material as the rotatable member 200 rotates. Accordingly, the buffer bits 104 operate as a radial cutter bit to provide a radial cutting surface to the worked material that is about half, or 180 degrees of the surrounding radial edge and flat outwardly facing surface. The buffer bit 104 also have a lower end 140 of the radial edge that is dimensioned to contiguously align with the portion of the bit body 102 forming the recesses 128 and 130. The facing surfaces of the buffer bits 104 is surrounded by the radial edge. Each of the buffer bits 104 may form a radial cutting surface on the rotatable member. Thus, each buffer bit 104 may cut through the worked material by cutting on the radius of the buffer bits 104 at the upper end 138 using the flat surface of the buffer bit 104 facing outwardly from the bit body 102.

Because each of the soil conditioners 100, including the buffer bits 104, is a relatively flat surface, in addition to being conditioned, the worked material may also be displaced by the bi-directional rotation of the buffer bits 104 through the worked material. Accordingly, the buffer bits 104 may be used as radial cutter bits to control displacement or movement of the worked material to a desired location by rotation of the rotatable member in combination with movement of the vehicle on which the rotatable member is mounted. By the rotation of the rotatable member, the worked material is lifted and temporarily carried by soil conditioners 100 from one location to another. During operation, the radial cutting action of the buffer bits 104 not only displaces the material, but also conveys the worked material for deposition in a different location. The movement of the worked material from one location to another advantageously allows both conditioning of the worked material and also grooming, grading, leveling and/or backfilling using the rotation of the radial cutter bits.

The buffer bits 104 may be fixedly and rigidly mounted in the respective recesses 128 and 130 by welding or mechanical fasteners. Due to the opposing flat surfaces, the inwardly facing flat surface of the buffer bits 104 contiguously aligns and is fully supported by the bit body 102 in respective recesses 128 and 130. Thus, the bit body 102 provides support of the buffer bits 104 against shearing forces in either direction the soil conditioners are rotated on the rotatable member. The lower end 140 of each buffer bit 104 may be dimensioned to align with the respective recess 128 and 130. In the illustrated example, the respective recesses 128 and 130 each form a respective alignment cradle such that the buffer bits 104 inserted into the respective recesses 128 and 130 are aligned in the recess 128 and 130 by the alignment cradle 142. In this way, buffer bits 104 positioned in the respective recesses 128 and 130 are automatically and accurately aligned in the recess 128 and 130 by the alignment cradle 142 to create a predetermined attack angle or rake angle when striking the worked material. Accordingly, coupling of the buffer bits 104 to the bit body 102, such as by brazing the buffer bits 104 to the bit body 102 may be accomplished without additional alignment procedures. In some examples, a compression holder, such as a clamp mechanism contacting the contact surfaces 136 of the opposed buffer bits 104 may be used to further hold the buffer bits 104 in the respective recesses 128 and 130.

Figure 3:
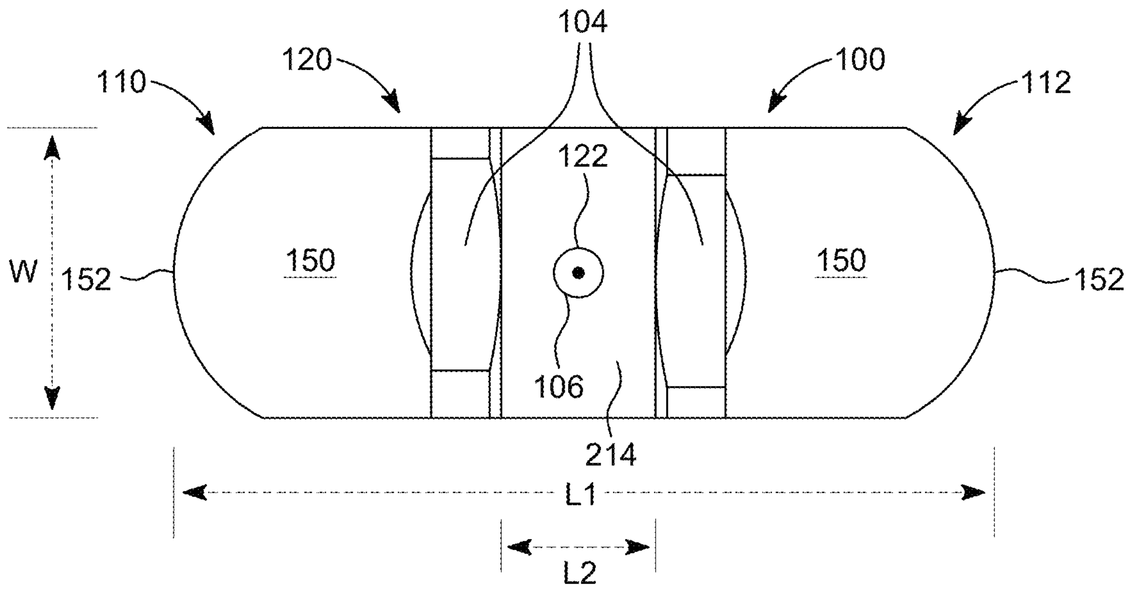
FIG. 3 is a top view of a soil conditioner.

FIG. 3 is a top view of a soil conditioner 100. In FIG. 3, the buffer bits 104 are illustrated as positioned on opposing sides of the bit body 102 in a back-to-back configuration proximate the top surface 132. The wear tip 106 may be positioned between the buffer bits 104 proximate the central axis 122 of the bit body 102. Referring to FIGS. 1-3, the first side 110 and the second side 112 include respective wall surfaces 150 that are matching. The wall surfaces 150 extend outwardly away from respective bit bodies 102 to a peripheral edge 152 of the perimeter edge 118. The peripheral edges 152 define a length (L1) of the mounting surface 116 in the direction of horizontal rotation of the rotatable member 200. The top surface 132 includes a length (L2) in the direction of horizontal rotation of the rotatable member 200 that is less than length L1 of the mounting surface 116. The width (W) of the top surface 132 and the mounting surface 116 in this example may be equal.

Due to the length L1 of the mounting surface being greater than the width W, the bit body 102 is tapered along the wall surface 150 of the first side 110 and the wall surface 150 of the second side 112. Accordingly, as the buffer bits 104 contact the worked material the tapered surface of the wall surfaces is presented to the worked material so as to minimize/avoid normalized/direct shearing forces on the soil conditioner 100 due to the rotational force in either direction of the rotatable member 200. In addition, the wall surfaces 150 are convex to deflect the worked material around the soil conditioners 100, in the absence of a normalized planar surface for rotational contact with the worked material, which further reduces/minimizes or eliminates shearing forces on the soil conditioner 100. In the example illustrated in FIGS. 1-3, wall surfaces 150 are continuously curved with a constant radius of curvature. Accordingly, the peripheral edges 152 are arcuate at a predetermined radius equal to the constant radius of curvature. The opposing sides 120 are flat planar surfaces to similarly avoid shearing forces acting on the soil conditioners 100 as the rotatable member 200 rotates horizontally around the horizontal axis 206 in either a clockwise direction 202 or a counter-clockwise direction 204.

Figure 4:
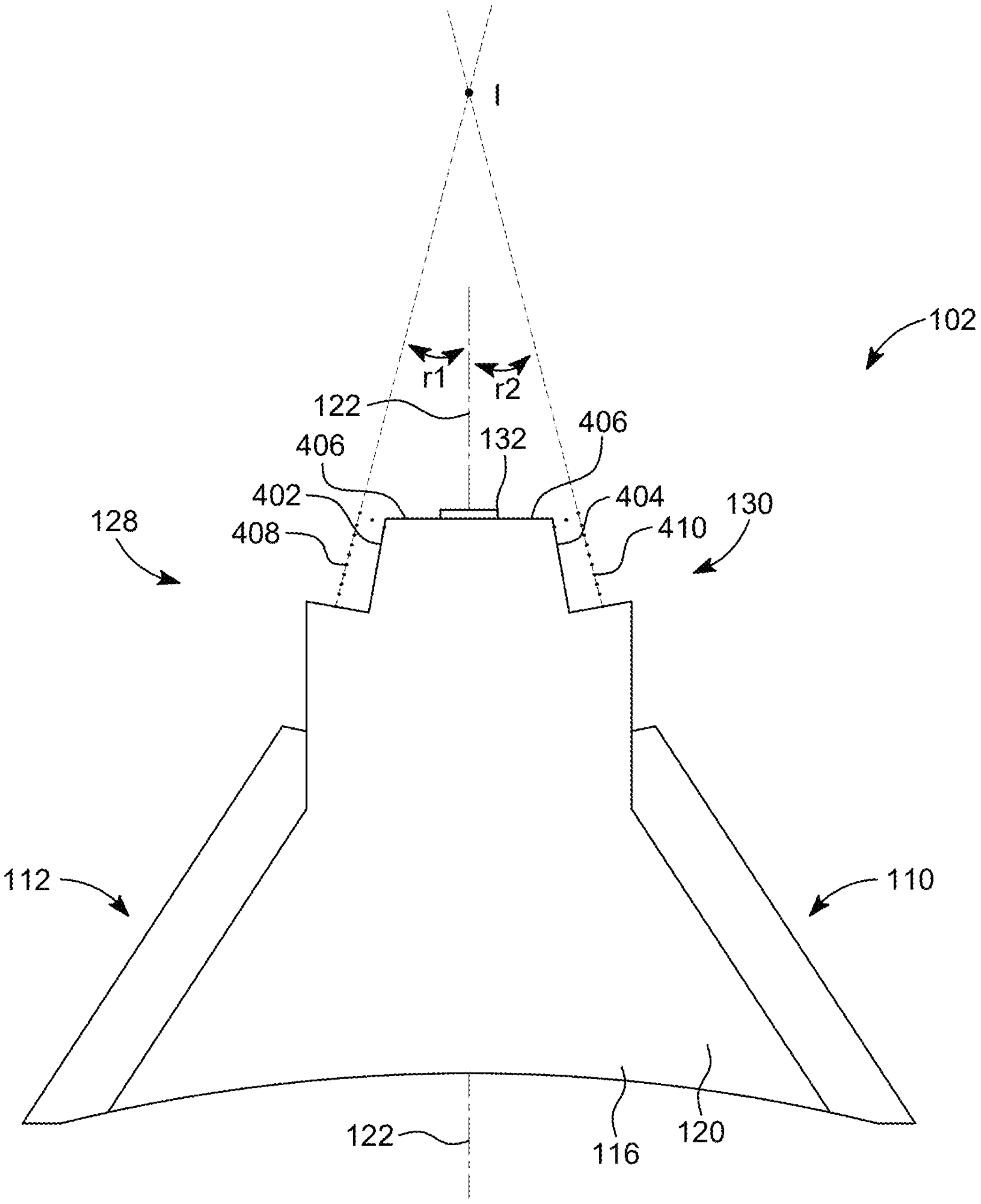
FIG. 4 is a side view of an example of the soil conditioner.

FIG. 4 is a side view of an example of the soil conditioner 100. In FIG. 4, the buffer bits 104 have been shown with dotted lines as a first buffer bit 402 and a second buffer bit 404. The first recess 128 and the second recess 130 are positioned on opposing sides of the bit body 102 separated by the top surface 132 and defining peripheral edges 406 of the top surface 132. The first buffer bit 402 may be mounted in the first recess 128, such that a planar cutting surface 408 of the first buffer bit 402 is positioned at a first rake angle (r1). The second buffer bit 404 may be mounted in the second recess 130 such that a planar cutting surface of the second buffer bit 404 has a planar cutting surface 410 positioned at a second rake angle (r2).

The first rake angle (r1) and the second rake angle (r2) may have the same rake angle, or different rake angles, with respect to the central axis 122. In some examples, the rake angle may be in a range of 0 degrees to 90 degrees. In other examples, the rake angle may be in a range of 5 degrees to 20 degrees, or in another example from 5 degrees to 30 degrees. The planar cutting surfaces of the first buffer bit 402 and the second buffer bit 304 lie in respective planes (illustrated as dot-dash lines in FIG. 4) on opposite sides of the bit body. Due to the respective rake angles (r1 and r2), the planes in which the respective planar cutting surfaces lie intersect at a point (I) above the soil conditioner 100 on the central axis 122.

Since the first buffer bit 402 and the second buffer bit 404 are on opposite sides of the bit body 102, one of the buffer bits 402 or 404 are driven through the worked material when the rotational body 200 (FIG. 2) rotates in either horizontal direction. In other examples, the rake angles of the first and second buffer bits 402 and 404 may be created by other than the first and second recesses 128 and 130. For example, the buffer bits themselves may be tapered to create respective rake angles.

Because of the first and second buffer bits 402 and 404 are at predetermined rake angles, shear force on the buffer bits 402 and 404, due to the rotation of the rotating member 200 in either direction, is minimized. This effectively keeps the bond between the first and second buffer bits 402 and 404 and the bit body 102 in compression in both directions of rotation of the rotatable member 200.

Figure 5:
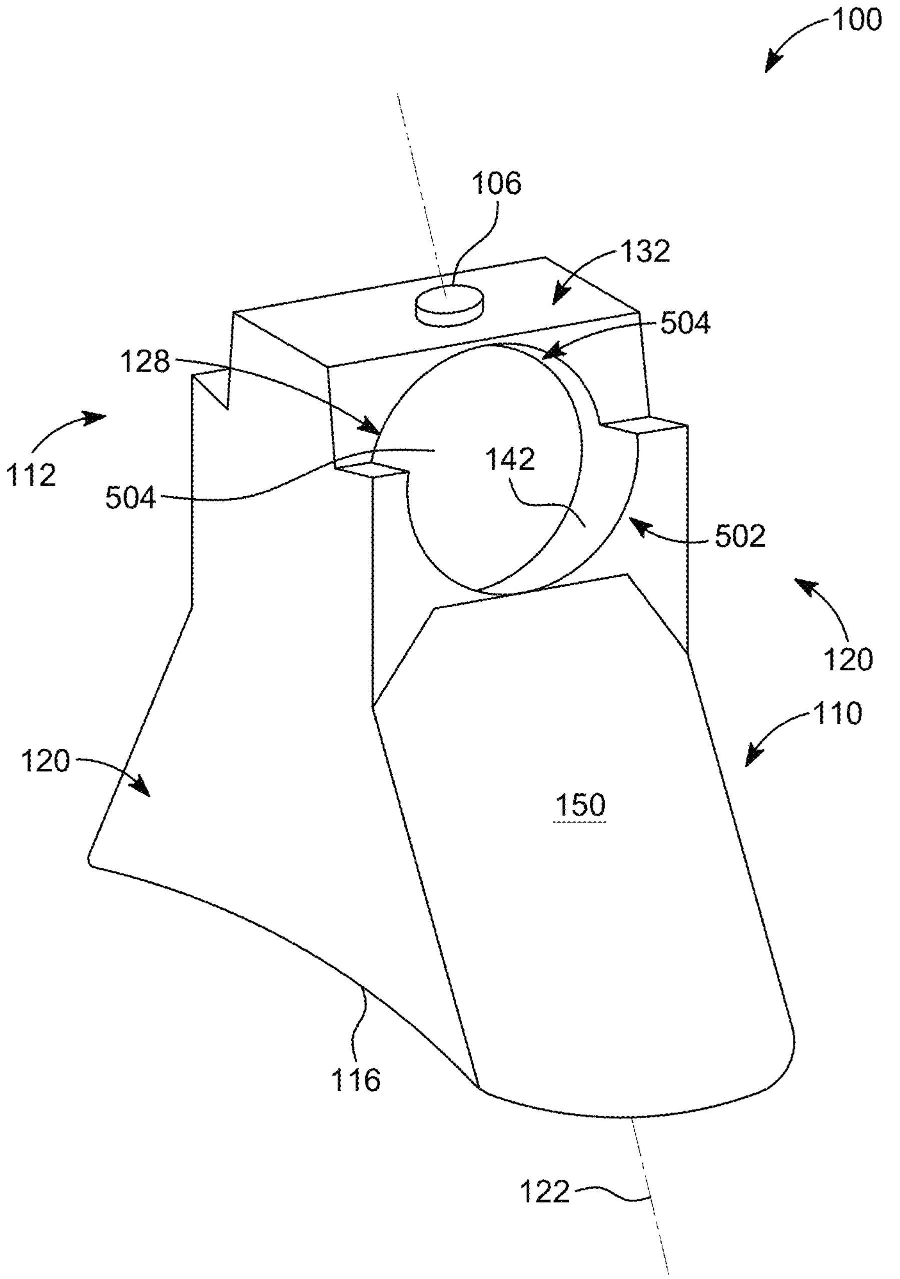
FIG. 5 is a perspective view of an example bit body of a soil conditioner.

FIG. 5 is a perspective view of an example bit body 102 of a soil conditioner. In this example, the buffer bit 104 (FIG. 1) has been removed from the recess 128 for illustrative purposes. Referring to FIGS. 1 and 4, in this example, the buffer bits 104 are cylindrical and have a predetermined radius defined by a circumferentially surrounding peripheral edge. Thus, the alignment cradle 142 includes a matching or corresponding predetermined radius to receive and hold the buffer bits 104. In addition, the alignment cradle 142 may include a ledge 502 upon which the lower end 140 of the buffer bit 104 may be positioned such that the lower end 140 of the buffer bit 104 does not extend beyond the ledge 502.

At least a portion of the upper end 138 of the buffer bit 104 may, for example, abut a curb 504 at the upper end 138 of the buffer bit 104, such that only a portion of the upper end extend away from the bit body 102. Accordingly, a buffer bit 104 mounted in the recess 128 or 130 may be in contiguous contact with the alignment cradle 142 along the peripheral edge of the buffer bit 104 at the lower end 140 and be exposed to the worked material at the upper end 138. In addition, a back surface 504 of the recess 128 or 130 may be in contiguous contact with a back surface of a respective buffer bit 104. In examples, the back surface of the buffer bit 104 may be brazed to the bit body 102 at the alignment cradle 142 and at the back surface 504.

In FIG. 5, the curb 504 may provide structural support to maintain the buffer bit 104 in position in the recess 128. In addition, the curb 504 may provide an alignment function during installation of the buffer bit 104 in the recess 128, such as during a brazing operation to fixedly adhere the buffer bit 104 to the bit body 102. The buffer bit 104 may extend beyond the curb 504 and away from the bit body 102 a predetermined distance such that it is the buffer bit 104 that makes first contact with the worked material during clockwise or counterclockwise rotation of a rotatable member due to the buffer bit 104 being a denser and thus more durable material with longer wear characteristics than the bit body 102. In other examples, such as the examples of FIGS. 1 and 3, the curb 504 may be omitted and the buffer bit 104 may still make first contact with the worked material. The buffer bit 104 may be equal to or less than the depth of the ledge 502 to maximize contiguous fixed contact of the lower end 140 of the buffer bit 104 with ledge 502 of the alignment cradle 142. In other examples, the lower end 140 of the buffer bit 104 may extend beyond the ledge 502 and the wall surface 150 of the first and second sides 110 and 112.

Figure 6:
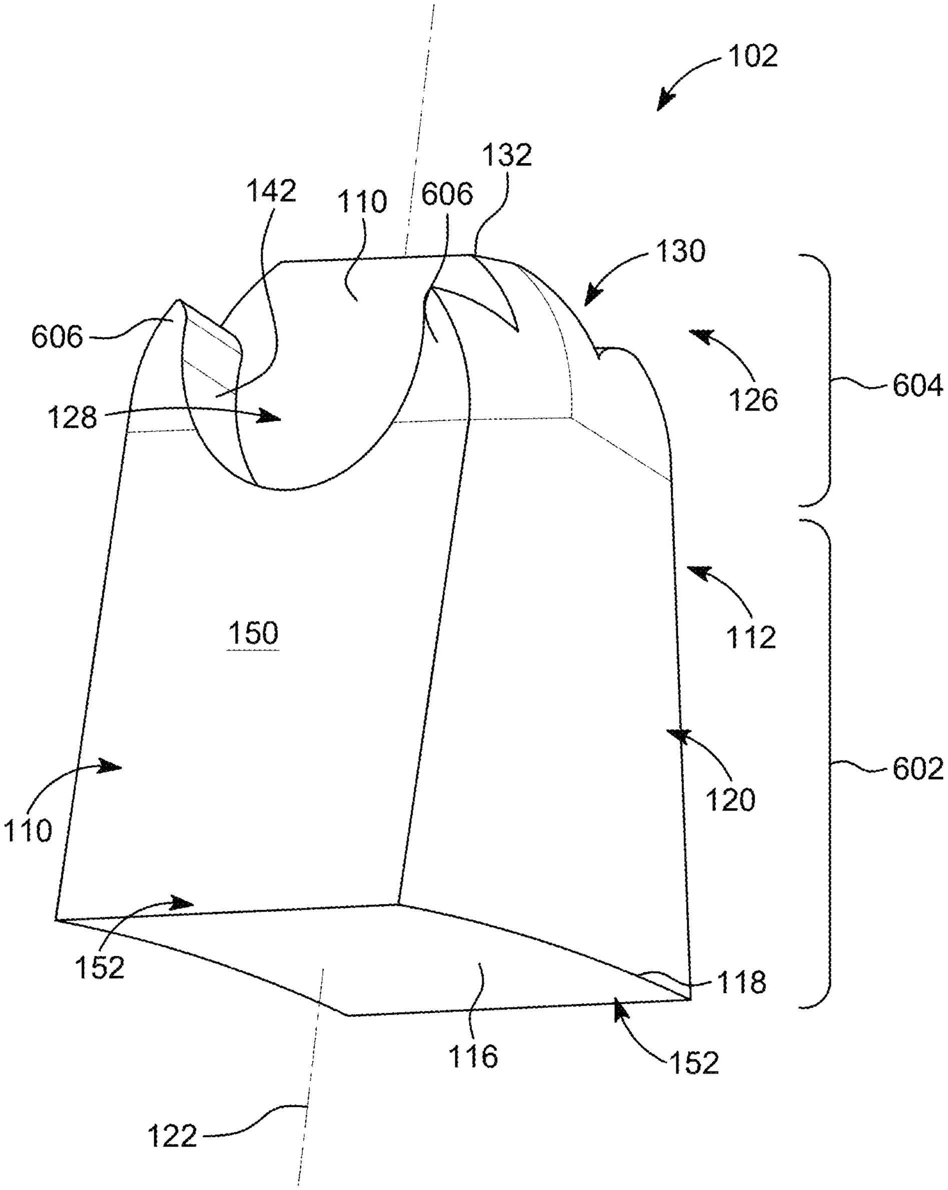
FIG. 6 is a perspective view of an example bit body 102 of a soil conditioner.

FIG. 6 is a perspective view of an example bit body 102 of a soil conditioner. In FIG. 6, the buffer bits 104 (FIG. 1) have been removed from the recesses 128 and 130 of the bit body 102 for illustrative purposes. Unless otherwise indicated, the features and functionality of the soil conditioner systems (FIGS. 1-5) are applicable. Accordingly, for purposes of brevity the details of these features and functionality may not be repeated, and it should be understood that features and functionality are fully interchangeable, combinable, and/or useable in the example systems described herein.

In the example bit body 102 of FIG. 6, the perimeter edge 118 of the mounting surface 116 defines the mounting surface 116 as being substantially rectangular. The bit body 102 may be tapered along the wall surface 150 of the first side 110 and the second side 112. Thus, the length between the peripheral edges 152 is greater than the length between the opposing side walls 120. with square. In other examples, other shapes of the mounting surface 116 are possible. In this example, the lower surface 116 includes a radius of curvature that may match the surface of the rotational member 200, or may be a flat planar surface. The portion of the bit body 102 formed with the first side 110 and second side 112 may be tapered to minimize shear force as the soil conditioner system is rotated in either a clockwise direction or a counterclockwise direction on a rotatable member.

Figure 7:
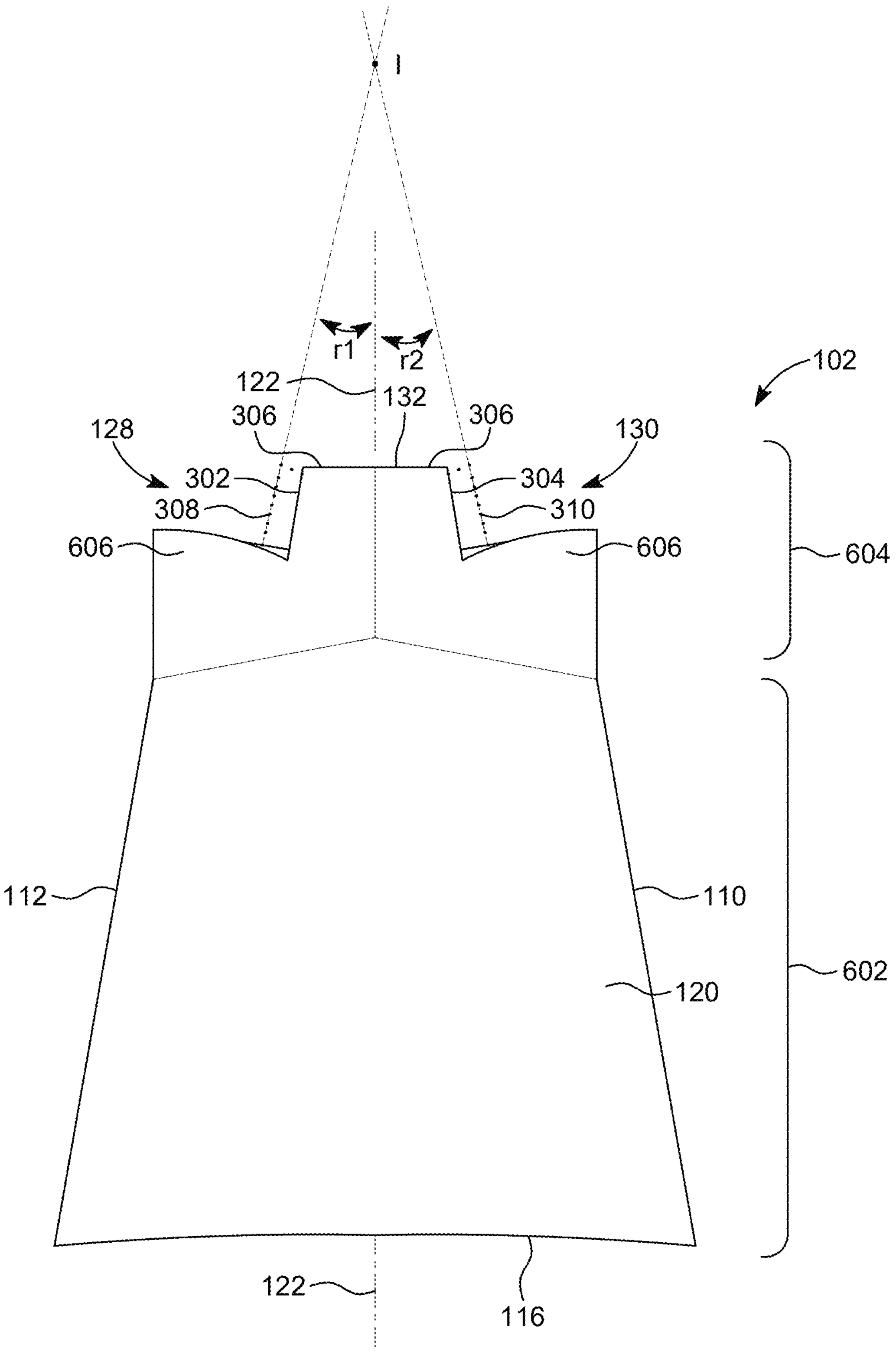
FIG. 7 is a side-view of the example bit body of FIG. 6.

FIG. 7 is a side-view of the example bit body 102 of FIG. 6. The buffer bits are illustrated as shown in dotted lines as the first buffer bit 302 and the second buffer bit 304 lying in respective first and second planes 308 and 310 that intersect at point "I" due to the respective rake angles (r1 & r2). Unless otherwise indicated, the features and functionality of the soil conditioner system (FIGS. 1-6) are applicable. Accordingly, for purposes of brevity the details of these features and functionality may not be repeated, and it should be understood that features and functionality are fully interchangeable, combinable, and/or useable in the example systems described herein.

In FIG. 7, the first side 110 and second side 112 are flat planar surfaces forming the tapered shape of the bit body 102 by sloping, or extending obliquely, between the mounting surface 116 and the alignment cradle 142 in which the buffer bits 302 and 304 are positioned. The slope of the flat planar surfaces of the first and second sides 110 and 112 may be a predetermined angle that minimizes shear forces as the soil conditioner system is rotated in either a clockwise direction or a counterclockwise direction on a rotatable member. As shown in FIGS. 6 & 7, each of the opposing side walls 120 include a lower wall section 602 that are planar surfaces longitudinally extending from the perimeter edges 118 of the mounting surface 116 toward the first end 126 of the bit body 102, and an upper wall section 604 formed as a curved surface extending from the lower wall section to a top surface 132 of the bit body 102 at the first end 126. The upper wall section 604 may include first and second flanges 606 formed to abut and constrain a portion of the respective buffer bit positioned in the respective recess 128 or 130. The first and second flanges 606 may form a part of the curved surface.

Figure 8:
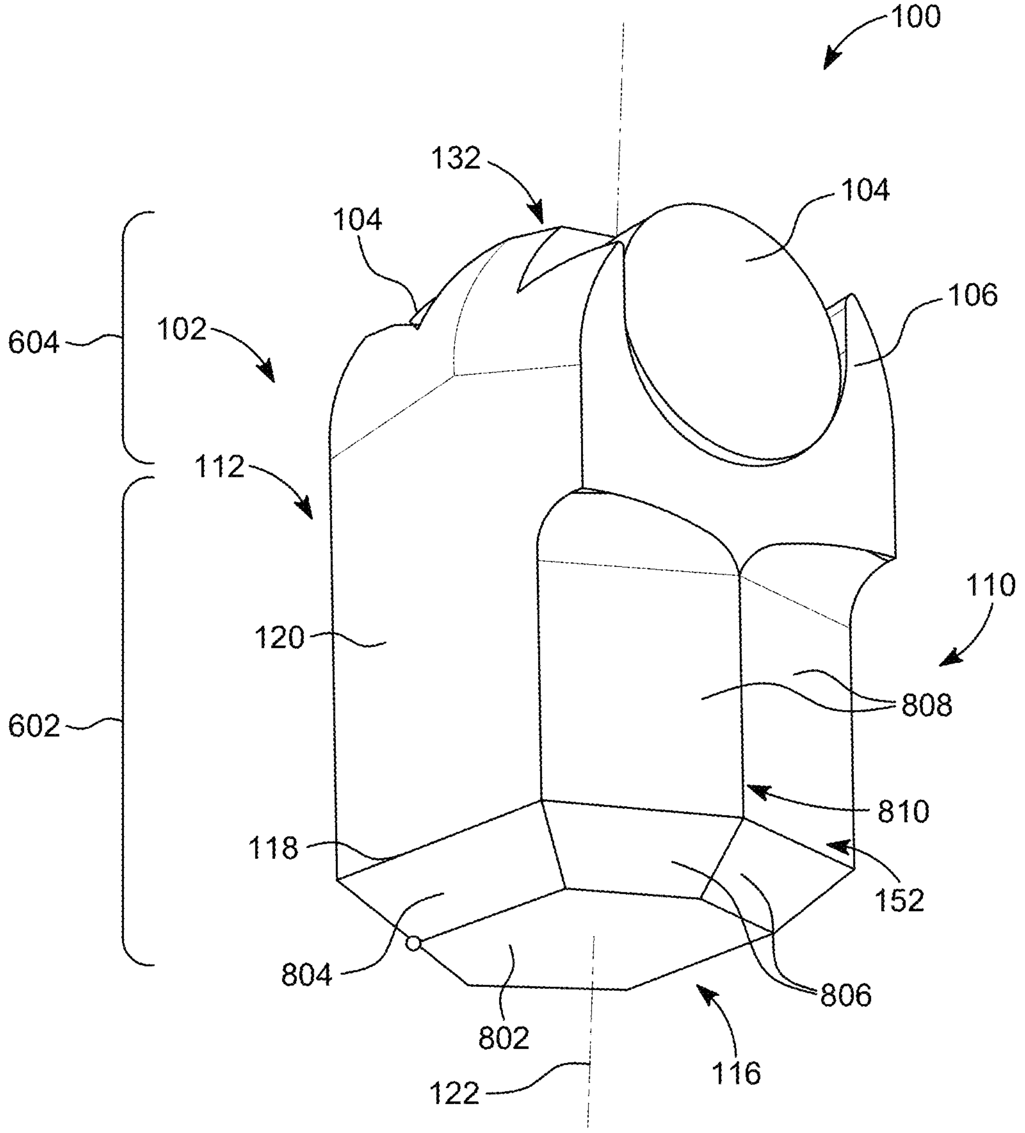
FIG. 8 is perspective view of an example soil conditioner that includes a bit body and buffer bits mounted in a back-to-back configuration.
Figure 9:
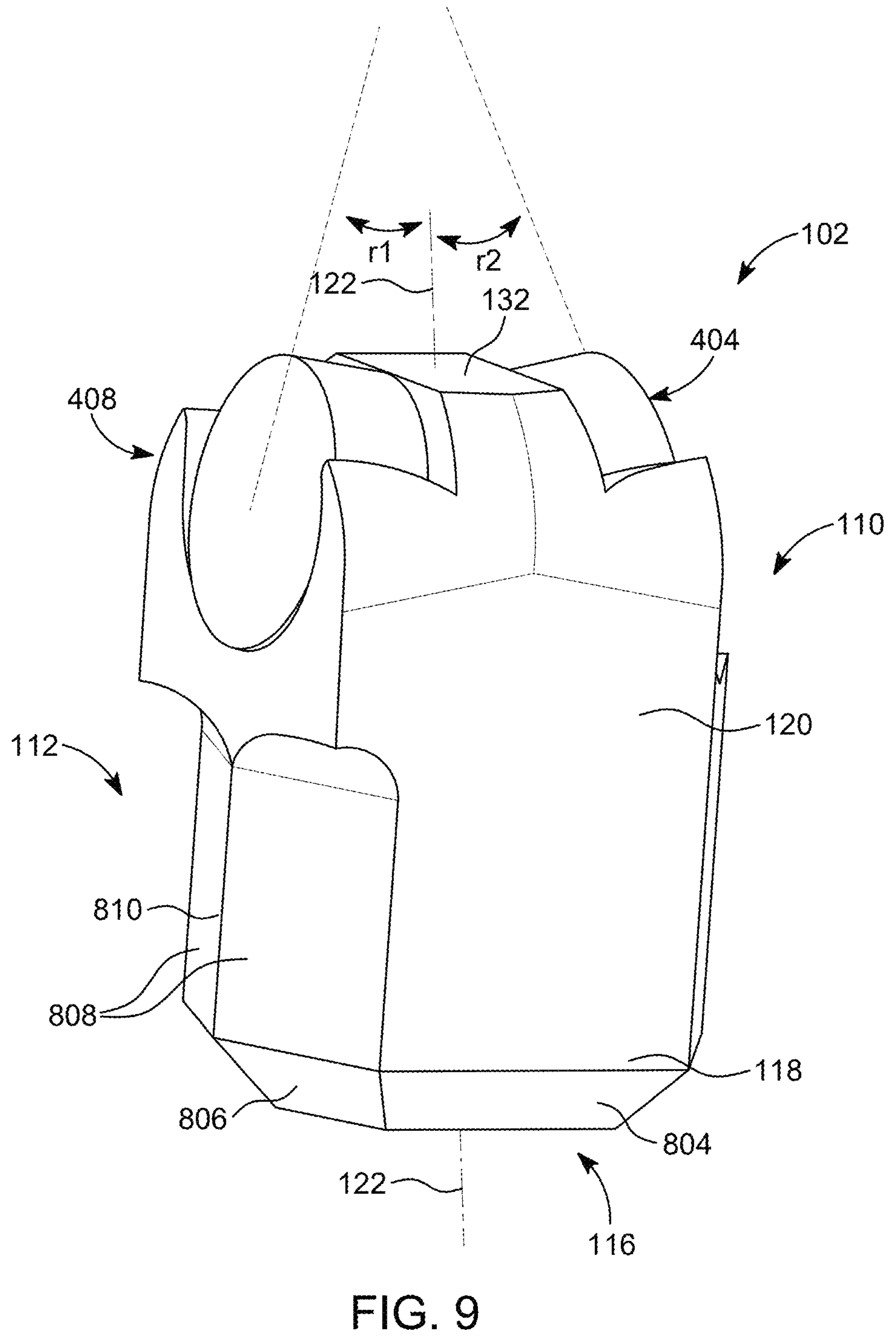
FIG. 9 is perspective view of the soil conditioner of FIG. 8.

FIG. 8 and FIG. 9 are perspective views of an example soil conditioner 100 that includes a bit body 102 and buffer bits 104 mounted in a back-to-back configuration. Unless otherwise indicated, the features and functionality of the soil conditioner system (FIGS. 1-7) are applicable. Accordingly, for purposes of brevity the details of these features and functionality may not be repeated, and it should be understood that features and functionality are fully interchangeable, combinable, and/or useable in the example systems described herein.

In the example of FIG. 8, the mounting surface 116 is formed as a convex surface protruding away from the bit body 102. The illustrated mounting surface 116 includes a flat planar surface 802 positioned concentric to the central axis 122, and in a plane substantially parallel to the top surface 132. In addition, the mounting surface 116 may include beveled surfaces surrounding the flat planar surface 802. For example, opposing side beveled surfaces 804 may extend between the perimeter edge 118 and the flat planar surface 802 in a plane that is oblique to the flat planar surface 802 and the respective planar surfaces of the opposing sidewalls 120. Further, the mounting surface 116 may include beveled first and second side panels 806 extending between the peripheral edge 152 of the perimeter edge 118 and the flat planar surface 802 in a plane that is oblique to the flat planar surface 802 and a convex surface of the first side and the second side 110 and 112 of the bit body 102.

In this example, the convex surface of the wall surface of the first side 110 and the wall surface of the second side 112 comprises a plurality of planar surfaces 808 lying in planes that intersect along an edge 810 respectively formed in the wall surface of the first side 110 and the wall surface of the second side 112. The edge 810 may be aligned in parallel with the central axis 122 of the bit body 102. The mounting surface 210 of a rotatable member 200 (FIG. 2) or bit holder (not shown) may include a corresponding concaved surface that abuts and is fixedly coupled, such as by brazing, with at least some of the flat planar surface 802 and the beveled surfaces 804 and 806. In this way, forces experienced by the bit body 102 that are opposite the direction of rotation (either clockwise or counter clock wise) of the rotatable member may be received at the beveled surfaces 804 and 806, thereby minimizing shearing forces being absorbed only by the fixed coupling, such as brazing, between the bit body 102 and the mounting surface 210 of the rotatable member 200 (FIG. 2) or a bit holder. In examples, some of the beveled surfaces, such as the side beveled surfaces 804 may be absent and the opposing sides 120 may extend to the flat planar surface 802 and intersect perpendicularly therewith. In this example configuration, the perimeter edge 118 may be at the opposing sides 120 where the opposing sides 120 extend away from the mounting surface 210 or the bit holder.

The planar surfaces 808 included in each of convex first side 110 and the convex second side 112 are illustrated as flat planar surfaces extending from the opposing sides 120 to an apex of the convex shape of the first and second sides 110 and 112 where the edge 810 is positioned. Thus, the worked material first contacts the edge 810 present on the first and second sides 110 and 112 as the soil conditioner system rotates in either a clockwise or a counterclockwise direction and is deflected away from the bit body 102 by the planar surfaces 808. Accordingly shearing forces are further minimized.

Figure 10A:
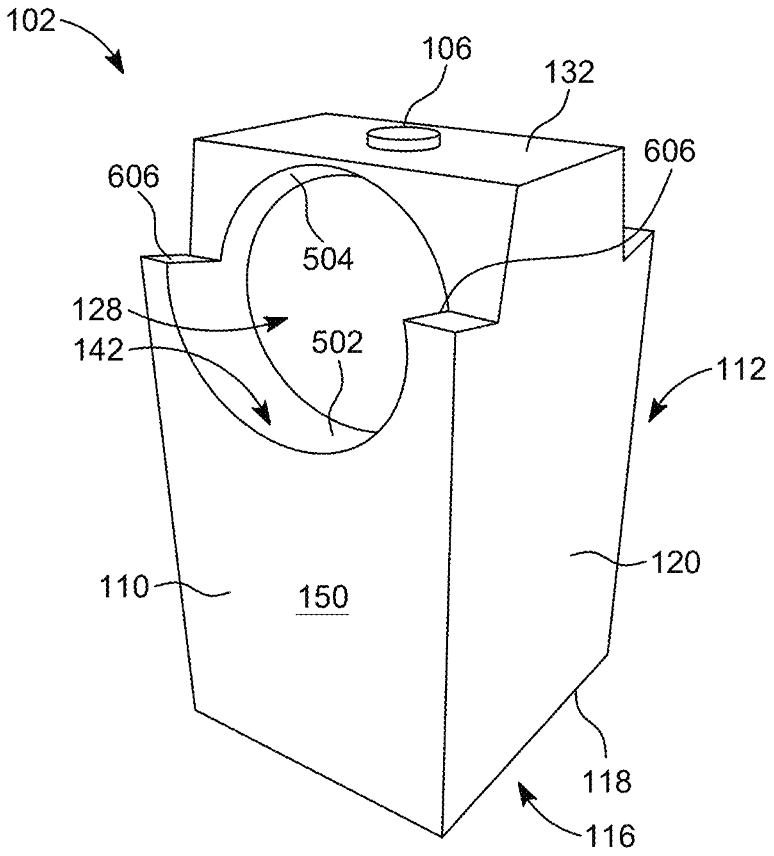
FIG. 10A is a perspective view of another example bit body of a soil conditioner.

FIG. 10A is a perspective view of another example bit body 102 of a soil conditioner. In FIG. 10A, the buffer bits, which are mounted in the respective recesses 128 and 130 are omitted, and the top surface 132 of this example includes the wear tip 106. The respective recesses 128 and 130 are formed to include an alignment cradle 142. The alignment cradle 142 for holding the respective buffer bits bit at the respective rake angle. Unless otherwise indicated, the features and functionality of the soil conditioner systems (FIGS. 1-9) are applicable. Accordingly, for purposes of brevity the details of these features and functionality may not be repeated, and it should be understood that features and functionality are fully interchangeable, combinable, and/or useable in the example systems described herein.

In the example of FIG. 10A, the opposing side walls 120, the first wall 110 and the second wall 112 are flat planar surfaces extending from the mounting surface 116 to the first end 126 of the bit body 102. The wall surface 150 of the first side 110 and the wall surface 150 of the second side 112 are flat planar surfaces lying in parallel planes to define the perimeter edge 118 of the mounting surface 116. The mounting surface 116 may be a square or rectangular shape, with, or without a predetermined radius of curvature to align with the mounting surface of the rotatable member. The first and second walls 110 and 112 may extend to the alignment cradle 142. In the example of FIG. 10A, the alignment cradle 142 may include the ledge 502 and curb 504, and the buffer bit 104 may or may not extend away from the bit body 102 beyond the ledge 502. In other examples, the curb 504 may be omitted. In FIG. 10A, the wall surface 150 of the first and second sides 110 and 112 may longitudinally extend a predetermined distance from the mounting surface 116 toward the top surface 132 to concentrically surround the lower end of the buffer bit and form the alignment cradle 142 and ledge 502. The wall surface 150 may end at the flanges 606 such that the upper end of the buffer bit is exposed in order to be the first to contact the worked material as the soil conditioner system is rotated in either a clockwise or a counter clockwise direction, while still providing a radial surface area of the ledge 502 for fixedly adhering the buffer bit to the ledge in the alignment cradle 142.

Figure 10B:
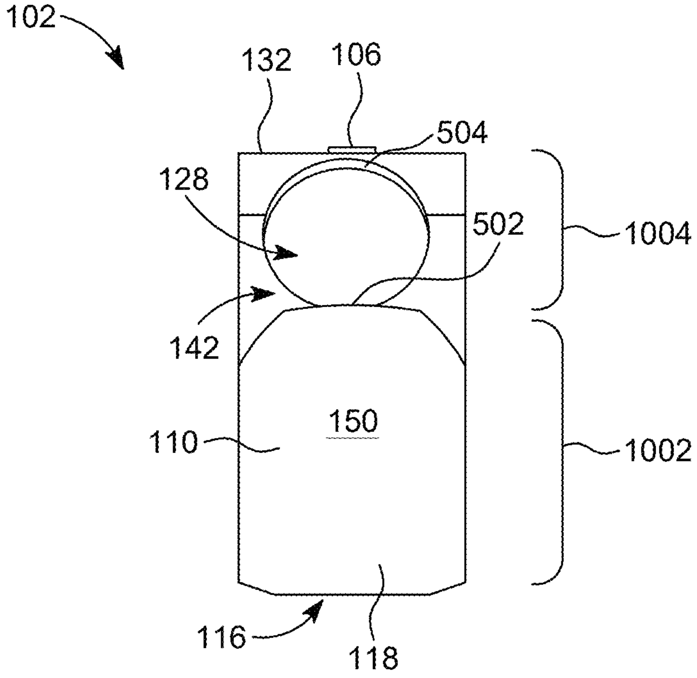
FIG. 10B is a front view of an example bit body of a soil conditioner.

FIG. 10B is a front view of an example bit body 102 of a soil conditioner. In FIG. 10B, the buffer bit is omitted from the recess 128. Unless otherwise indicated, the features and functionality of the soil conditioner systems (FIGS. 1-10) are applicable. Accordingly, for purposes of brevity the details of these features and functionality may not be repeated, and it should be understood that features and functionality are fully interchangeable, combinable, and/or useable in the example systems described herein.

In FIG. 10B, the bit body 102 may include a lower section 1002 and an upper section 1004. The first and second sides 110 and 112 may be included in the lower section 1002. The wall surface 150 in the first section 1002 may be a convex surface as illustrated that longitudinally extends from the mounting surface 116 to the ledge 502 of the mounting cradle 142 in parallel with the opposing side walls 120. In other examples, the wall surface 150 may be a planar flat surface that longitudinally extends from the mounting surface 116 to the ledge 502 of the mounting cradle 142 in parallel with the opposing side walls 120. The upper section 1004 of the bit body 102 may include the flanges 606 that circumferentially surround a portion of the buffer bit that includes the lower end. In addition, the recess 128 may include the ledge 502 and the curb 504. In examples, the upper section 1004 may be beveled at the desired rake angle r1 or r2 of the buffer bit and the width of the ledge 502 and the curb 504 may be equal and the buffer bit may extend away from the bit body 102 at both the upper and lower ends.

Figure 11:
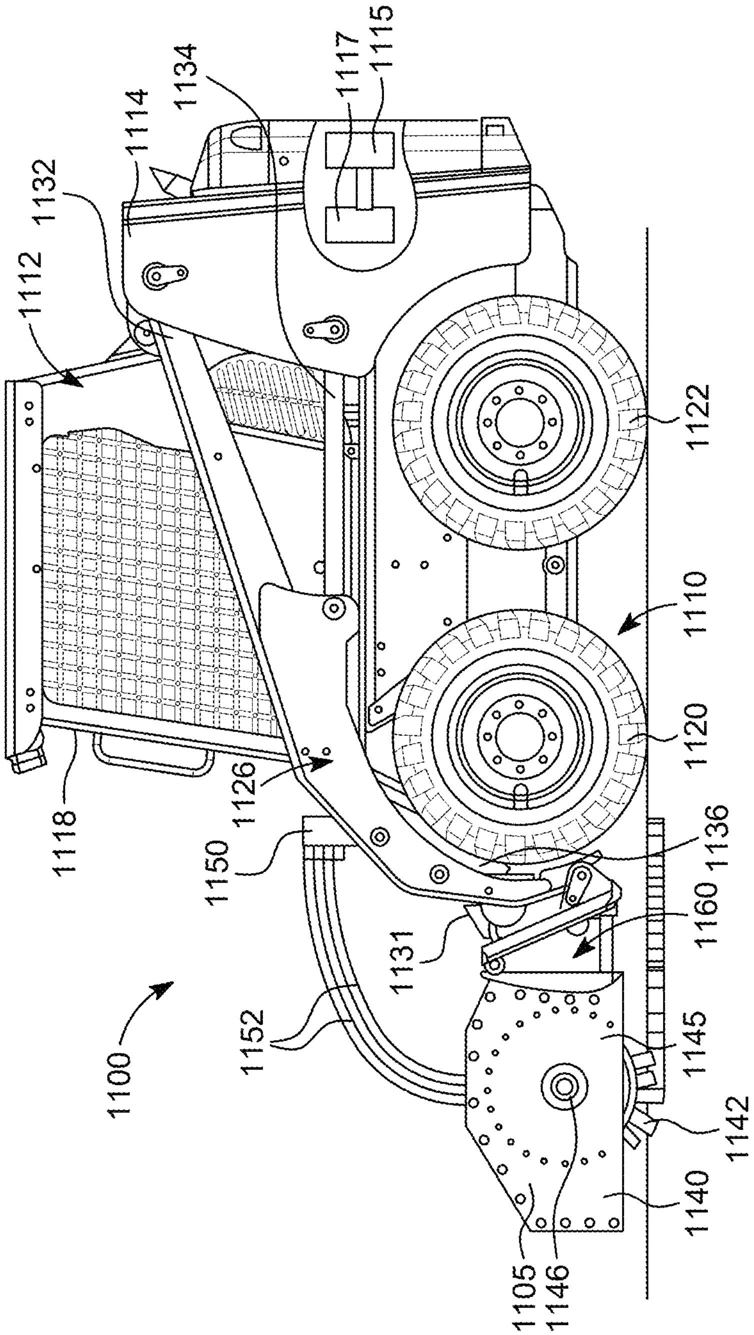
FIG. 11 is a side view of an example of a machine having a soil conditioner system.

FIG. 11 illustrates an example of a machine 1100 having the soil conditioner system described herein mounted on a rotatable member. The machine 1100 can be any form of drive device capable of rotating any one of the example soil conditioner systems described herein. In the illustrated example, the machine is a skid steer loader having a front end attachment system configured for any of the example soil conditioner system described herein. Other machines such as those for earth work or construction may be used, such as loaders, graters, and the like. The machine 1100 may be equipped with multiple systems to facilitate operation of machine at a worksite, for example, a cylindrical rotatable conditioner system 1105 containing soil conditioners mounted on a rotatable member. The machine 1100 may include, a drive system 1110, and an engine system 1115 (shown in a rear compartment) mounted to a frame body 1112. The engine system 1115 may include an electric motor and/or an internal combustion engine. The engine system 1115 may provide power to the cylindrical rotatable conditioner system 1105, directly or indirectly, or may drive a hydraulic pump 1117 (shown in cutaway), such as an axial piston pump, via output shaft to provide pressurized fluid from a reservoir (not shown) to drive other hydraulic components, such as hydraulic cylinders and motors. As will be appreciated, such machine components may be powered or driven by hydraulic motors and cylinders.

In one example, the machine frame body 1112 includes left and right upright portions 1114, respectively, and an operator's station 1118. The drive system 1110 may include ground engaging members 1120, 1122, such as wheels or tracks, mounted on and to support the body 1112. The ground engaging members 1120, 1122 may be powered and driven by the engine system 1115.

The cylindrical rotatable conditioner system 1105 is attached to lift arm assemblies 1126 by a coupler assembly 1131, which is itself pivotally connected with the lift arm assemblies 1126. The lift arm assembly includes a lift arm 1132 pivotally connected with the upright portions 1114 of the body 1112 at lift arm pivot point, which may be positioned rearward of the ground engaging members 1120, 1122. A lift actuator 1134, which typically is a conventional hydraulic cylinder or other linear acting actuator, during its extension or retraction causes pivot of the lift arm 1132 relative to the body 1112, thereby lifting or lowering the cylindrical rotatable conditioner system 1105. The lift actuator 1134 is connected at one end to the upright portion of the body 1112 at a connection point located above the ground engaging members, and connected at its opposite end to the lift arm 1132. Tilt actuators 1136, which are typically hydraulic or other linear acting actuator, may cause the cylindrical cutting system 1105 to pivot relative to the lift arm 1132. The tilt actuator 1136 is connected between the lift arm 1132 and the coupler assembly 1131, as shown.

The cylindrical rotatable conditioner system 1105 includes an elongated housing 1140 to surround and provide appropriate internal clearance to the rotatable member with soil conditioners 1142 mounted thereon (shown extending through an opening underneath the housing 1140) and a hydraulic motor 1145 (shown in dotted lines) that couples to the rotatable member via an output shaft 1146. In one example, the hydraulic motor 1145 is coupled adjacent to the rotatable member along a common axis. A hydraulic power unit 1150 may be coupled to the frame body 1112, and ultimately to the hydraulic pump and to the reservoir. Hydraulic fluid supply and drain lines 1152 may be extended between the hydraulic power unit 1150 and the hydraulic motor 1145. A hydraulic valve unit (not shown) associated upstream of the hydraulic motor may also be contained within the housing 1140 or coupled to the hydraulic power unit 1150, to control the flow and/or pressure of fluid being directed to the hydraulic motor.

The housing 1140 of the cylindrical rotatable conditioner system 1105 is attached to lift arm assemblies 1126 by the coupler assembly 1131. In one example, an attachment frame 1160 is disposed between the housing 1140 and the coupler assembly 1131. The attachment frame 1160 may provide a rigid connection between the machine frame body 1112 and the housing 1140 in order to maintain a desired depth in the worked material during operation. The attachment frame 1160 may also allow the ability for tilting and other movement of the housing 1140 relative to the machine frame body 1112 to maintain a desired conditioning pattern in the worked material. To operate, pressurized fluid provided by the hydraulic pump may be directed to the hydraulic motor 1145 via the hydraulic power unit 1150 and the lines 1152 to cause the motor 1145 and the shaft 1146 to rotate, thereby rotating the rotatable member about a horizontal axis in either a clockwise direction, or a counter clockwise direction. Adjustments of horizontal rotation direction (clockwise or counter clockwise), the depth of the rotatable member in the worked material, and the conditioning pattern may be accommodated by directed fluid from the hydraulic pump to the corresponding cylinders. In some cases, and in different machines, the cylindrical rotatable conditioner system 1105 may be more integrated into the frame body of the machine, such as between the ground engaging members. In this case, the engine via a geared direct drive transmission may provide direct or indirect power to the shaft rotating the cutting system or the cutting system may still be powered by a hydraulic motor.

The foregoing detailed description should be regarded as illustrative rather than limiting, and the following claims, including all equivalents, are intended to define the spirit and scope of this invention.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

The invention claimed is:

1. A soil conditioner system comprising:

a bit body having a first side and a second side, wherein the first and second sides are opposing sides of the bit body;

the bit body including, at a first end of the bit body, a first recess on the first side and a second recess on the second side, such that the first recess and the second recess are on the opposing sides of the bit body;

the bit body including, at a second end of the bit body, a mounting surface, the mounting surface coupled with a rotatable member, the rotatable member being bi-directionally rotatable about a horizontal central axis along which the rotatable member longitudinally extends;

a first buffer bit mounted in the first recess, the first buffer bit having a planar cutting surface positioned at a first rake angle; and a second buffer bit mounted in the second recess, the second buffer bit having a planar cutting surface positioned at a second rake angle such that the first buffer bit and the second buffer bit are on opposite sides of the bit body with respective planar cutting surfaces lying in intersecting planes.

2. The soil conditioner system of claim 1, wherein the first rake angle is equal to the second rake angle.

3. The soil conditioner system of claim 1, wherein the mounting surface includes a bottom surface having a predetermined radius that aligns with a radius of curvature of the rotatable member.

4. The soil conditioner system of claim 1, wherein the bit body includes a wear tip at the first end, the wear tip positioned at an apex of the first end.

5. The soil conditioner system of claim 4, wherein the wear tip is polycrystalline diamond.

6. The soil conditioner system of claim 4, wherein the wear tip is hardened steel or carbide steel.

7. The soil conditioner system of claim 1, wherein the bit body extends transversely away from the rotatable member to the first end.

8. The soil conditioner system of claim 1, wherein the first side includes a front face formed as a first planar surface in which the first recess is disposed and the second side includes a rear face formed as a second planar surface in which the second recess is disposed, the first planar surface and the second planar surface being opposing planar surfaces.

9. A soil conditioner system comprising:

a bit body;

a first buffer bit and a second buffer bit mounted in a back-to-back configuration at a first end of the bit body;

the first buffer bit and the second buffer bit mounted in respective recesses formed in the bit body on opposite sides of the bit body at the first end;

the bit body comprising a mounting surface at a second end of the bit body, the mounting surface to rigidly couple the bit body with a horizontally rotatable member such that the bit body extends transversely away from an outer surface of the horizontally rotatable member to the first end; and the bit body including a first side and a second side disposed on opposing sides of the bit body to face opposite directions of horizontal rotation of the horizontally rotatable member and being positioned between the mounting surface and the first buffer bit and the second buffer bit, respectively, wherein each of the first buffer bit and the second buffer bit include a planar cutting surface positioned at a respective rake angle such that the planar cutting surface of the first buffer bit and the second buffer bit lie in intersecting planes.

10. The soil conditioner system of claim 9, wherein the respective recesses are formed to include an alignment cradle, the alignment cradle to hold the first buffer bit and the second buffer bit at the respective rake angle.

11. The soil conditioner system of claim 9, wherein the first side includes a wall surface longitudinally extending between the first buffer bit and the mounting surface and the second side includes a wall surface longitudinally extending between the second buffer bit and the mounting surface, wherein the wall surface of the first side and the wall surface of the second side are matching surfaces.

12. The soil conditioner system of claim 11, wherein the mounting surface has a length and a width, the length being greater than the width such that the bit body is tapered along the wall surface of the first side and the wall surface of the second side.

13. The soil conditioner system of claim 12, wherein the wall surface of the first side and the wall surface of the second side is a convex surface across the width of the mounting surface.

14. The soil conditioner system of claim 13, wherein the convex surface of the wall surface of the first side and the wall surface of the second side is continuously curved with a constant radius of curvature.

15. The soil conditioner system of claim 13, wherein the convex surface of the wall surface of the first side and the wall surface of the second side comprises a plurality of planar surfaces intersecting along an edge respectively formed in the wall surface of the first side and the wall surface of the second side parallel with a central axis of the bit body.

16. The soil conditioner system of claim 11, wherein the wall surface of the first side and the wall surface of the second side are flat planar surfaces lying in parallel planes.

17. The soil conditioner system of claim 9, wherein the bit body further comprises opposing side walls comprising a lower wall section extending as a flat planar surface from the mounting surface at the second end of the bit body toward the first end of the bit body, and an upper wall section formed as a curved surface extending from the lower wall section to a top surface of the bit body at the first end.

18. The soil conditioner system of claim 17, wherein the upper wall section comprises a first flange formed to abut and constrain a portion of first buffer bit, and a second flange formed to abut and constrain a portion of the second buffer bit, the first and second flanges forming a part of the curved surface.

19. The soil conditioner system of claim 9, wherein the first and second bits are radial bits having a radial cutting surface.

20. A soil conditioner system comprising:

a bit body;

a first buffer bit and a second buffer bit mounted in a back-to-back configuration at a first end of the bit body;

the first buffer bit and the second buffer bit mounted in respective recesses formed in the bit body on opposite sides of the bit body at the first end;

the bit body comprising a mounting surface at a second end of the bit body, the mounting surface to rigidly couple the bit body with a horizontally rotatable member such that the bit body extends transversely away from an outer surface of the horizontally rotatable member to the first end; and the bit body including a first side and a second side disposed on opposing sides of the bit body to face opposite directions of horizontal rotation of the horizontally rotatable member and being positioned between the mounting surface and the first buffer bit and the second buffer bit, respectively, wherein the bit body further comprises opposing side walls comprising a lower wall section extending as a flat planar surface from the mounting surface at the second end of the bit body toward the first end of the bit body, and an upper wall section formed as a curved surface extending from the lower wall section to a top surface of the bit body at the first end.

* * * * *